May 11, 1943.  W. L. O'BRIEN  2,318,621
REFRIGERATION
Filed Sept. 16, 1941  2 Sheets-Sheet 1
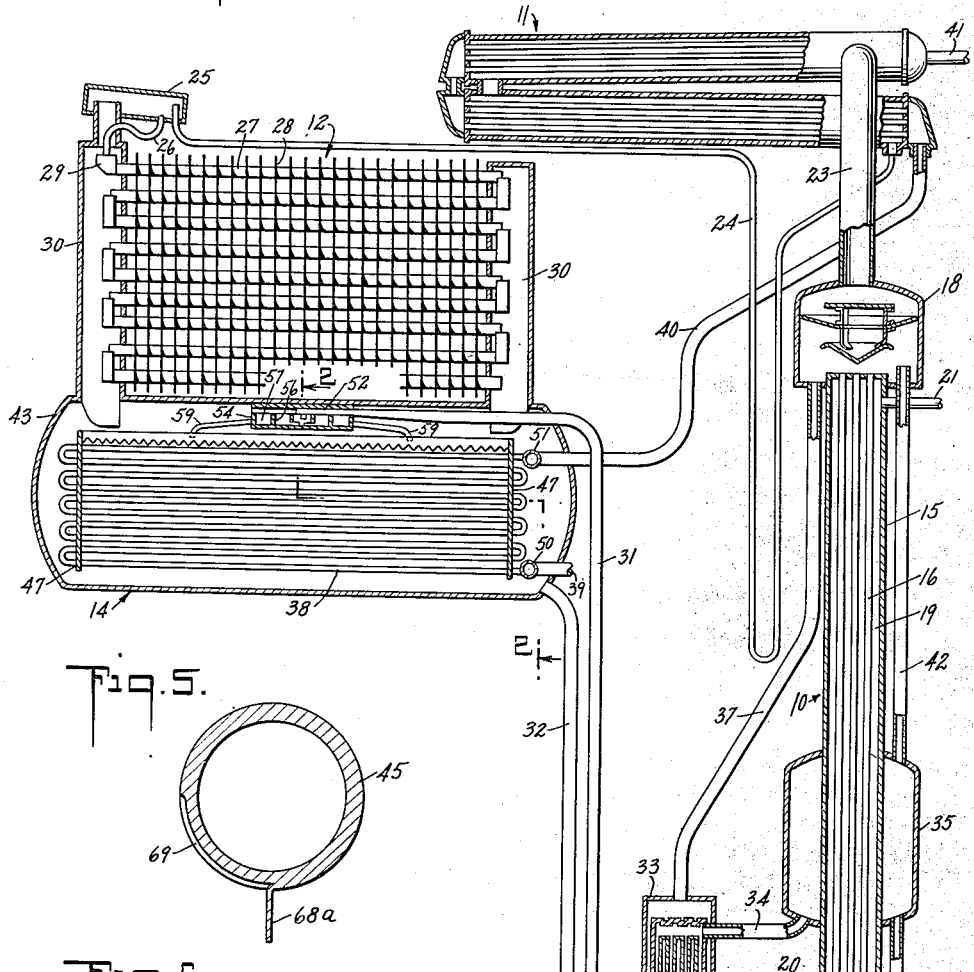
INVENTOR.
William L. O'Brien
BY
his ATTORNEY May 11, 1943.  W. L. O'BRIEN  2,318,621
REFRIGERATION
Filed Sept. 16, 1941  2 Sheets-Sheet 2
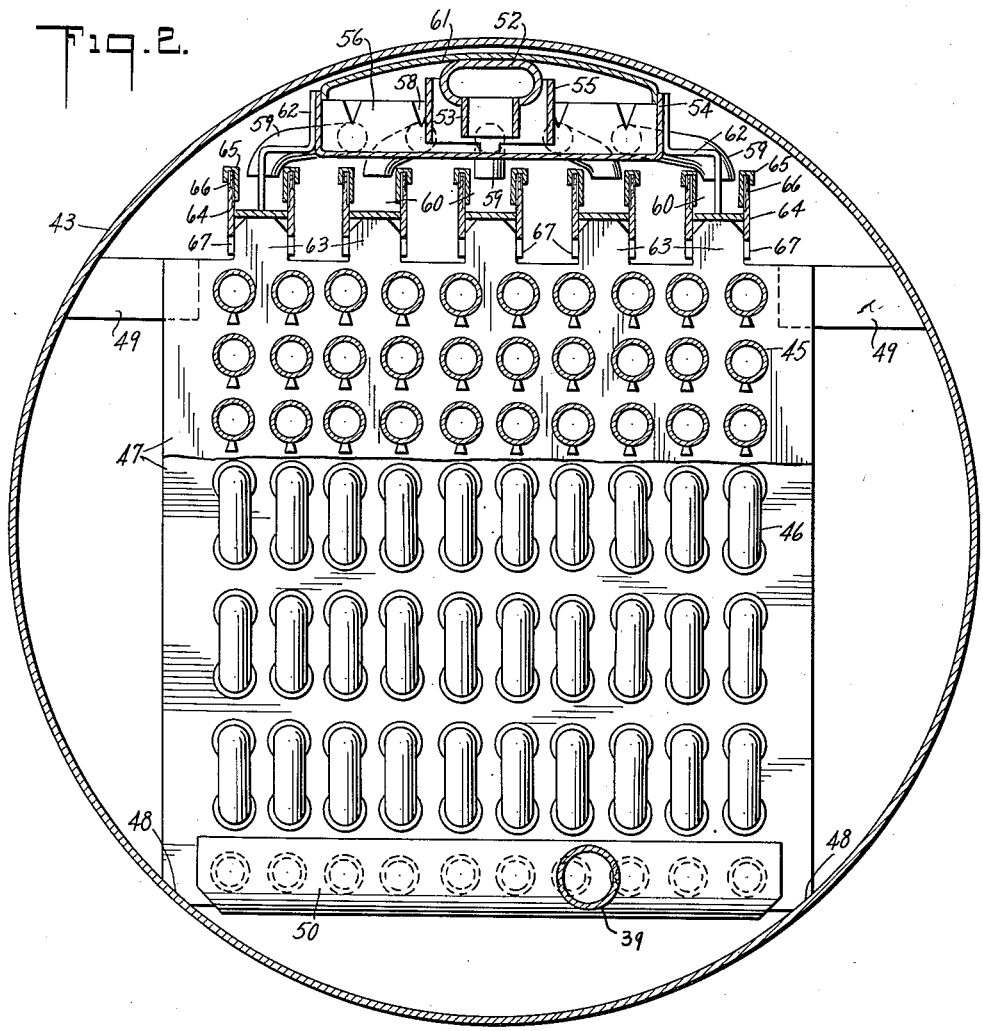
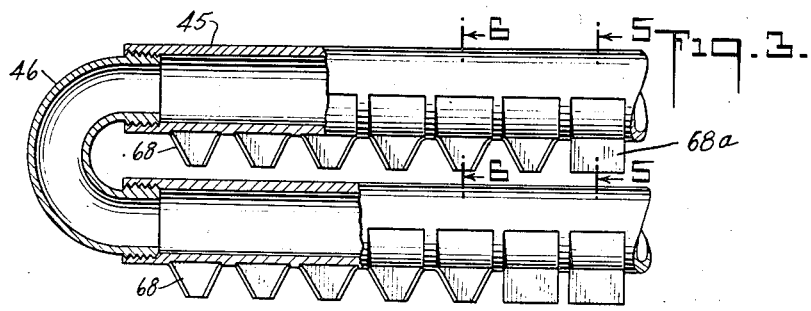
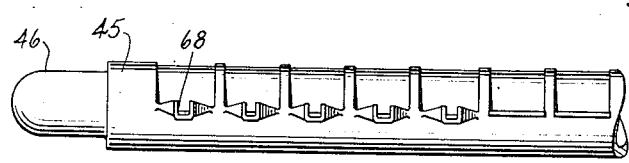
INVENTOR
William L. O'Brien
BY
his ATTORNEY Patented May 11, 1943

2,318,621

UNITED STATES PATENT OFFICE 2,318,621

REFRIGERATION

William L. O'Brien, Evansville, Ind., assignor to Servel, Inc., New York, N. Y., a corporation of Delaware Application September 16, 1941, Serial No. 410,965

8 Claims. (Cl. 62—119)

My invention relates to refrigeration, and more particularly to absorbers of absorption-type refrigeration systems.

In absorbers of the so-called "film" type a film of absorption liquid is caused to form on the surfaces of piping through which a cooling medium flows. While flowing over the pipe surfaces the absorption liquid absorbs refrigerant vapor, and the resulting heat of absorption is transferred to the cooling medium, such as water, which flows inside the piping. The spreading and forming of a film of absorption liquid on the piping is of considerable importance because this is one factor that determines the size of an absorber for a refrigeration system of a given capacity. In refrigeration systems of large capacity it is particularly desirable to provide an absorber of minimum size to keep the refrigeration system as small as possible so that it will occupy a minimum amount of space.

The spreading of absorption liquid on the piping is facilitated by causing liquid drops to form at the bottom sides of substantially horizontal tubes onto the top surfaces of successively lower tubes. In this way a rainfall is simulated with the drops of liquid always flowing onto the top surfaces of all the tubes of the absorber piping to maintain the latter in a completely wetted state.

In accordance with my invention, in order to effect spreading of absorption liquid on the exterior of piping, I employ piping having lobes formed from metal removed from the outer surface of the piping. The lobes are formed at the bottom of the piping and are shaped to provide a plurality of closely adjacent independent drip surfaces from which drops of liquid fall in rapid succession.

The invention, together with the objects and advantages thereof, will be more fully understood from the following description and accompanying drawings forming a part of this specification, and of which Fig. 1 is a view more or less diagrammatically illustrating an absorption refrigeration system embodying the invention;

Fig. 2 is an enlarged vertical view taken at line 2—2 of Fig. 1, partly broken away and in section, to illustrate the compact arrangement of the piping in the absorber;

Fig. 3 is an enlarged vertical view of a portion of the piping in the absorber, partly broken away and in section, to illustrate more clearly the horizontal drip surfaces embodying the invention;

Fig. 4 is a bottom view of the piping shown in Fig. 3; and

Figs. 5 and 6 are sectional views taken at lines 5—5 and 6—6, respectively, of Fig. 3.

Referring to Fig. 1, my invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator 10, a condenser 11, an evaporator 12 and an absorber 14 which are interconnected in such a manner that the pressure differential in the system is maintained by liquid columns.

The generator 10 includes an outer shell 15 within which are disposed a plurality of vertical riser tubes 16 having the lower ends thereof communicating with a space 17, and the upper ends thereof extending into and above the bottom of a vapor separating vessel 18. The space 19 within shell 15 forms a steam chamber about the tubes 16 to which steam is supplied through a conduit 20. The space 19 provides for full length heating of tubes 16 with a vent 21 to atmosphere being provided at the upper part of shell 15. A conduit 22 is connected to the lower part of shell 15 for draining condensate from space 19.

The system operates at a partial vacuum and contains a solution of refrigerant in absorption liquid, such as, for example, a water solution of lithium chloride or lithium bromide or a suitable mixture of such salts. With steam being supplied through conduit 20 to space 19 at atmospheric pressure, heat is supplied to tubes 16 whereby water vapor is expelled from solution, such expelled vapor being effective to raise liquid absorbent by gas or vapor-lift action. The expelled water vapor passes from the upper ends of the riser tubes into vessel 18, and thence passes through a conduit 23 into condenser 11 in which the vapor is liquefied. The condensate formed in condenser 11 flows through a U-tube 24, a chamber 25, and conduit 26 into the upper part of evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. Liquid refrigerant passes into successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14.

In absorber 14 refrigerant vapor is absorbed into absorption liquid which enters through a conduit 31, as will be described presently. The absorption liquid into which refgrigerant has been absorbed flows from absorber 14 through a conduit 32, a first passage in liquid heat exchanger 33, a conduit 34, vessel 35 and conduit 36 into the lower space 17 of generator 10. Refrigerant vapor is expelled out of solution in generator 10 by heating and absorption liquid is raised by gas or vapor-lift action in riser tubes 16, as explained above.

The raised absorption liquid from which refrigerant vapor has been expelled in generator 10 is conducted from vessel 18 through conduit 37, a second passage in liquid heat exchanger 33, and conduit 31 into the upper part of absorber 14. This circulation of absorption liquid results from raising of liquid by vapor-lift action in riser tubes 16 whereby the liquid can flow to absorber 14 and return from the latter to generator 10 by force of gravity. The upper part of vessel 35 is connected by a conduit 42 to vapor separating vessel 18, so that the pressure in vessel 35 is equalized with the pressure in the upper part of generator 10 and condenser 11.

The heat liberated with absorption of water vapor in absorber 14 is transferred to a suitable cooling medium, such as water, for example, which flows through vertically disposed piping 38. The cooling water enters the lower end of the piping 38 through a conduit 39 and leaves the upper end of the piping through a conduit 40. The conduit 40 is connected to condenser 11 whereby the same cooling water may be utilized to cool both condenser 11 and absorber 14, and from the condenser 11 the cooling water leaves through a conduit 41.

In order to simplify the drawings, the parts of the refrigeration system have not been shown in detail, such an illustration of the parts not being necessary for an understanding of my invention. The disclosure in the aforementioned Thomas and Anderson application may be considered as being incorporated in this application, and, if desired, reference may be made thereto for a detailed description of the refrigeration system.

The absorber 14 is generally like that described in application, Serial No. 350,234 of A. R. Thomas and P. P. Anderson, Jr., filed August 3, 1940. Referring more particularly to Figs. 1 and 2, the absorber 14 includes a cylindrical shell 43 to which is secured the lower ends of evaporator headers 30, so that vapor formed in evaporator 12 will pass through the headers into the shell 43. Within shell 43 is disposed the piping 38 formed to provide a plurality of vertical pipe banks arranged alongside of each other. Each pipe bank includes a plurality of substantially horizontal tubes 45 located one above the other and connected by bends 46. The ends of tubes 45 pass through and are secured at openings in end plates 47. The bottom corners of the end plates 47 are welded at 48 to the bottom corners of shell 43, and the top corners thereof are secured by brackets 49 to the upper parts of the shell to provide a rigid support for the piping 38.

The ends of the bottom tubes 45 of each pipe bank are connected to a manifold 50, as shown in Figs. 1 and 2. The top tubes are similarly connected at one end to another horizontal manifold 51, as shown in Fig. 1. The conduits 39 and 40, through which cooling water enters and leaves piping 38, pass through end openings in shell 43 and are connected to the manifolds 50 and 51, respectively.

The conduit 31 through which absorption liquid is introduced into absorber 14 terminates in a flattened or elliptical portion 52 disposed substantially at the center part of shell 43. The elliptical portion 52 is closed at its extreme end and to an opening in the bottom side thereof is secured a short tubular member 53 through which passes absorption liquid introduced into the vessel or receptacle 54. An annular member 55 is supported in a raised position in vessel 54 to prevent splashing of liquid entering the vessel.

The receptacle 54 is provided with spaced transverse walls 56 to provide smaller end compartments 57 into which liquid flows through V-shaped notches 58 'n the walls 56, as shown most clearly in Fig. 2. From the smaller end compartments 57 absorption liquid passes through a plurality of pipes 59 into troughs 60 which are located alongside of each other and extend lengthwise of the shell 44. It will be noted that the pipes 59 lead from directly opposite end compartments 57 at each end of vessel 54, so that absorption liquid is supplied to the same trough 60 at regions spaced from each other. The vessel 54 is provided with a cover 61 and is supported by suitable brackets 62 to the outermost troughs 60, as shown most clearly in Fig. 2.

The troughs 60 are H-shaped, as best shown in Fig. 2, and are supported at their ends by tabs 63 formed at the top edges of end plates 47. As shown most clearly in Fig. 2, the vertical pipe banks are positioned beneath the side walls 64 of the troughs 60. The troughs 60 are provided with inverted U-shaped cover plates 65 having long inner arms which extend into the troughs and shorter outer arms which overlie the outer surfaces of the side walls 64.

The side walls 64 and cover plates 65 are formed to provide capillary passages for siphoning and distributing liquid onto the uppermost tubes 45. As described in the Thomas and Anderson application Serial No. 350,234 referred to above, this may be accomplished by forming a plurality of closely adjacent vertical slots in the inner and outer surfaces of the side walls 64 and connecting such slots by cross slots at the top edges of the side walls. The slots in the side walls are covered by the plates 65 to form capillary passages, as indicated at 66 in Fig. 2, through which flow of liquid is effected by capillary siphon action. After the liquid in the troughs 60 reaches the lower edges of the long side walls of plates 65, flow of liquid is then effected by capillary siphon action. The liquid siphoned from the troughs 60 flows down the outer surfaces of the side walls 64 toward teeth 67 formed by notching the bottom edges of the walls. The downwardly flowing liquid is caused to flow toward a number of spaced points formed by teeth 67 at the bottom edges of the side walls 64 at which regions drops of liquid are formed. The teeth 67 are as close together as possible with the spacing being such that lateral bridging of the teeth with liquid is prevented. In this manner drops of liquid formed at the teeth 67 fall in rapid succession onto the top surfaces of the uppermost horizontal tubes 45. The Thomas and Anderson application just referred to may be considered as being incorporated in this application, and, if desired, reference may be made thereto for a detailed description of the longitudinal subdivision of liquid from the liquid trough 60.

In accordance with my invention, in order to produce and maintain a liquid film on all of the horizontal tubes 45 including the lowermost tubes in shell 43, a plurality of closely adjacent horizontal drip surfaces 68, which will also be referred to as lobes, are formed at the bottom parts of the tubes. The horizontal drip surfaces or lobes 68 are tapered and are U-shaped when viewed from the bottom, as shown in Fig. 4. With this arrangement liquid flowing by gravity over the surfaces of tubes 45 flows onto the lobes 68 at the extreme bottom edges of which drops of liquid are formed. The lobes 68 are as close together as possible with the spacing being such that lateral bridging of the lobes 68 with liquid is prevented. The extreme bottom edges of the lobes are preferably spaced from the top surface portions of the tubes 45 directly beneath the lobes a vertical distance substantially the diameter of a drop of liquid.

The absorption liquid flowing over the outer surfaces of the horizontal tubes 45 absorbs the water vapor passing into the shell 43 from evaporator 12 through the headers 30. The heat of absorption resulting from absorption of water vapor by the absorption solution is given up to the cooling water which flows inside the tubes 45. The solution, which is now diluted due to absoption of water vapor, passes from the bottom of shell 43 into the conduit 32 and thence flows to generator 10, as explained above.

The lobes 68 are preferably formed in several steps, the first step consisting in utilizing a flat sharp tool to raise a layer of metal to form a rectangular shaped tab 68a, as shown in Figs. 3 and 5. Referring more particularly to Fig. 5, it will be seen that the surface portion 69 from which surface metal has been removed to form the tab 68a is longer than the tab. This is due to the fact that as the metal tab is being formed and raised by the tool, the raised metal thickens with the resulting tab being shorter than the distance over which the tool has passed on the surface portion 69. The tab 68a is then subjected to a stamping or forming operation at which time the tab is bent from the vertical position shown in Fig. 5 to that shown in Fig. 6, and the side edges are folded to form the tapered lobes 68 having a U-shaped appearance when viewed from the bottom, as shown in Fig. 4.

In an absorber which has been built and like that illustrated and described above, copper tubing of approximately ⅝ inch outer diameter and having a wall thickness of $\frac{1}{32}$ inch has been successfully used for the horizontal tubes 45. In such an absorber a layer of surface metal approximately .008 inch thick is removed to provide tabs approximately .015 inch thick and about $\frac{7}{32}$ inch in length, the layer of removed metal forming a tab of greater thickness, as explained above. After the lobes are formed to provide tapered channels, the extreme bottom edges are about ½ inch apart.

By employing horizontal tubes formed with lobes 68 integral therewith, drops of liquid fall by gravity and in rapid succession along the entire lengths of the tubes to simulate a rainfall with the drops of liquid flowing onto the top surfaces of successively lower tubes and immediately merging thereon to form liquid films. In this way any tendency for the liquid drops to run together to produce individual streams of liquid at localized areas is avoided, the forming of such individual streams being objectionable in that the entire peripheral surfaces of the tubes are not completely wetted, whereby the capacity and ability of the absorber to absorb refrigerant vapor into absorption liquid is reduced. The lobes 68 not only function efficiently as horizontal drip surfaces but also serve as good heat exchange surfaces from which heat is given up to the cooling water flowing in the tubes 45, inasmuch as the lobes are integral with and form a part of the tubes.

While a single embodiment of my invention has been shown and described, such variations and modifications are contemplated which come within the true spirit and scope of the invention, as pointed out in the following claims.

What is claimed is:

1. In refrigeration apparatus including a generator for expelling refrigerant from absorption liquid, a condenser for liquefying the expelled refrigerant, an evaporator for evaporating the liquid refrigerant, and an absorber connected to receive evaporated refrigerant and having an inlet and an outlet for absorption liquid, said absorber including substantially horizontal tubes disposed one above the other, conduit means connected to said tubes for introducing cooling fluid thereto, and liquid drop formers at the bottom parts of said tubes to cause drops of liquid to form and fall freely by gravity onto the top surfaces of successively lower tubes, said drop formers comprising a layer of metal removed from the outer surfaces of said tubes and being spaced apart such a distance that spreading of liquid on the tubes to produce and maintain liquid films thereon is promoted.

2. Refrigeration apparatus of the absorption type including structure for effecting gas and liquid contact including a plurality of elements disposed one above the other, structure for delivering liquid onto one of said elements to produce and maintain a liquid film on a surface thereof, drop formers at a bottom part of said one element at which regions drops of liquid form and drop onto the next lower element, said drop formers utilizing a layer of surface material shaved from and still a part of said one element, the shaved surface material being shaped to provide said drop formers spaced such a distance apart that spreading of liquid on a surface of the next lower element is promoted.

3. In an absorption refrigeration system having a generator, a condenser, an evaporator and an absorber, and members connecting the aforementioned parts for circulation of refrigerant and absorption liquid, structure to subdivide liquid including a substantially horizontal liquid holder having a side wall provided with independent horizontal drip surfaces at its lower edge, means to deliver liquid to said holder, means to siphon liquid from said holder onto said side wall to cause drops of liquid to fall in rapid succession by gravity from said horizontal drip surfaces, a vertically disposed bank of substantially horizontal tubes located below said horizontal drip surfaces, connections for introducing cooling fluid to said tubes, and liquid drop formers at the bottom parts of said tubes to cause drops of liquid to form and fall freely by gravity onto the top surfaces of successively lower tubes; said drop formers comprising a layer of metal integral with said tubes and shaved from the outer surfaces thereof, said layers of metal being shaped and spaced apart such a distance that spreading of liquid on the tubes to produce and maintain liquid films thereon is promoted.

4. In absorption refrigeration apparatus, a first horizontally disposed tube, a second horizontally disposed tube below said first tube, structure to produce a freely falling liquid film on said first tube, liquid drop formers at the bottom part of said first tube to cause drops of liquid to form and fall freely by gravity onto the top surface part of said second tube, said drop formers comprising tabs integrally connected to said tubes and shaved from the outer surfaces of the latter, said tabs being shaped and spaced apart such a distance that bridging of the tabs with liquid is avoided and at the same time being sufficiently close together so that, when the drops of liquid hit said second tube, the drops of liquid practically immediately merge to form a liquid film on said second tube.

5. In an absorption refrigeration system having a generator, a condenser, an evaporator, and an absorber, and members connecting the aforementioned parts for circulation of refrigerant and absorption liquid, a plurality of vertically disposed banks of tubes arranged alongside each other, a conduit for conducting liquid, structure to subdivide liquid from said conduit laterally of said pipe banks and lengthwise of the latter in such a manner that liquid films are produced and maintained on the uppermost tubes of each of said pipe banks, conduit means connected to said pipe banks to introduce cooling medium thereto, and liquid drop formers at the bottom parts of said tubes comprising tabs integrally united to said tubes and each consisting of a layer of metal removed from an outer surface of a tube, said tabs serving as regions at which drops of liquid are formed and from which the drops fall freely by gravity onto the top surfaces of successively lower tubes in each pipe bank, the drops of liquid falling freely by gravity throughout the pipe banks simulating a rainfall whereby spreading of liquid on the tubes to produce and maintain liquid films thereon is promoted.

6. Refrigeration apparatus of the absorption type including structure for effecting gas and liquid contact including piping having tubes disposed substantially horizontally one above the other, a plurality of independent horizontal drop formers formed integrally with said tubes at the bottom parts thereof, conduit means connected to introduce a cooling fluid into said piping, structure for delivering liquid onto said piping whereby liquid descends by gravity from one tube to another, said drop formers comprising a layer of metal removed or shaved from the outer peripheral surfaces of said tubes and being shaped and spaced apart such a distance that drops of liquid form thereon and fall therefrom onto a successively lower tube sufficiently close together to merge practically immediately to produce and maintain liquid films on the tubes, and the bottom edges of said drop formers being spaced from the top of the tube immediately below it substantially the diameter of a drop of liquid.

7. Refrigeration apparatus of the absorption type including structure for effecting gas and liquid contact including elements disposed one above the other, structure for delivering liquid onto one of said elements to produce and maintain a liquid film on a surface thereof, spaced tabs at the bottom part of said one element shaped and spaced apart to provide a plurality of independent drip surfaces, and said tabs consisting of a layer of metal shaved from the outer surface of said one element and spaced apart such a distance that drops of liquid fall therefrom onto the next lower element and merge practically immediately to produce and maintain a liquid film on the surface of said next lower element.

8. Refrigeration apparatus of the absorption type including structure for effecting gas and liquid contact comprising piping having horizontal tubes disposed substantially horizontally one above the other, means to produce and maintain a liquid film on one of said tubes, tabs formed integrally with said one tube at the bottom part thereof, said tabs consisting of a layer of metal shaved from the outer surface of said one tube, the side edges of said tabs being bent to provide tapered drop formers with the extreme bottom edges being substantially U-shaped, and said drop formers being spaced apart such a distance that spreading of liquid to produce and maintain a liquid film on the next lower tube is promoted.

WILLIAM L. O'BRIEN.